Sept. 19, 1961      L. G. ARPIN      3,000,475

SPEED CONTROL FOR AUTOMOTIVE VEHICLES

Filed March 8, 1960      2 Sheets—Sheet 1

INVENTOR.
Leon G. Arpin
BY A. Stephen Baker
ATTORNEY

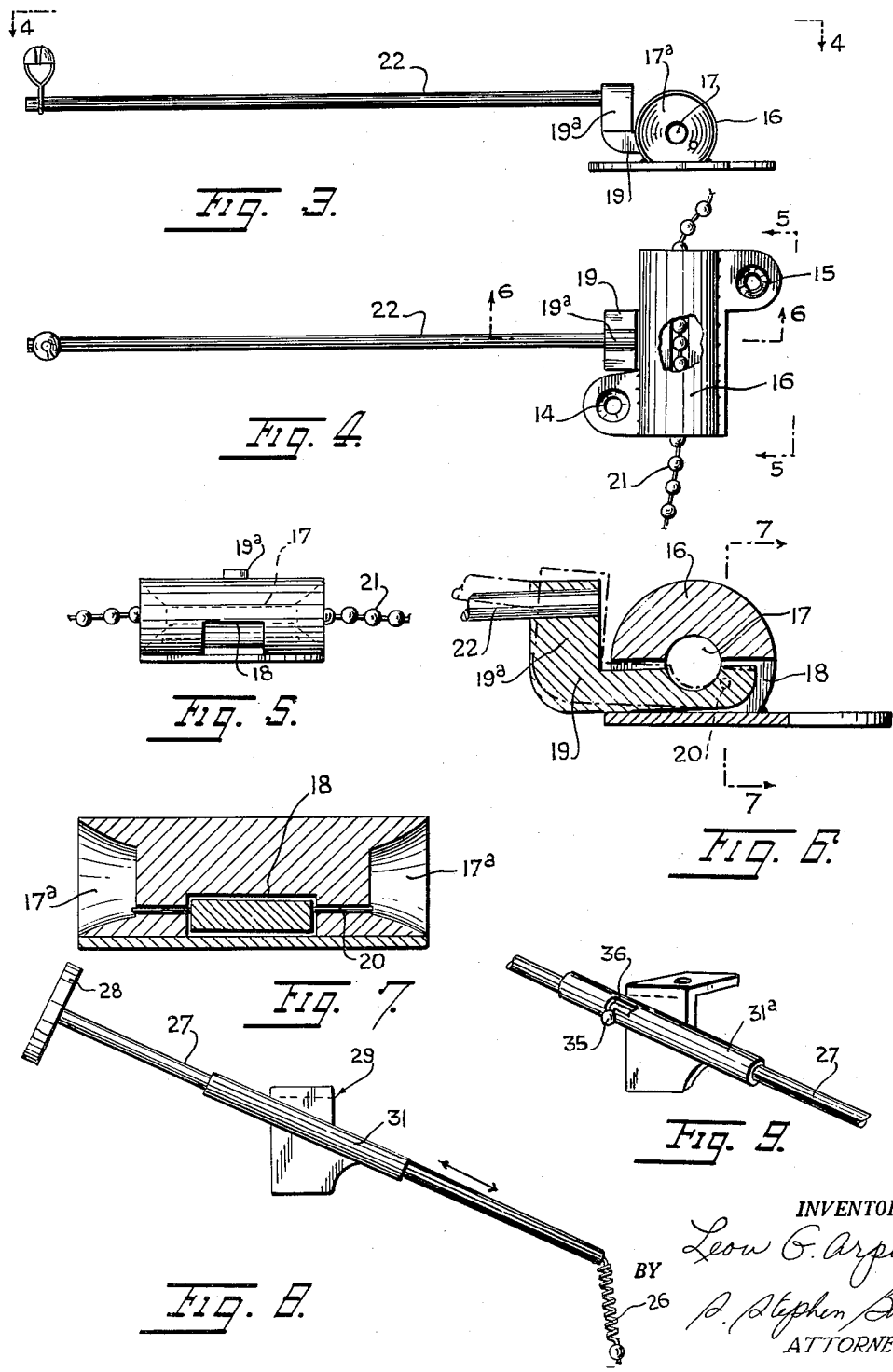

United States Patent Office 3,000,475
Patented Sept. 19, 1961

3,000,475
SPEED CONTROL FOR AUTOMOTIVE VEHICLES
Leon G. Arpin, 340 Mountain Ave., North Caldwell, N.J.
Filed Mar. 8, 1960, Ser. No. 13,510
5 Claims. (Cl. 192—3)

This invention relates to a speed control for use in automotive vehicles.

It is well known, of course, to provide devices which operate such a vehicle at a substantially fixed, predetermined speed without the necessity of holding the foot on the accelerator pedal. However, such devices have been relatively complex whether in installation or in operation. With the foregoing in mind, I have devised such a speed control which is of extreme simplicity without sacrificing reliability and ease of operation. Further, if the device breaks and thus fails, the vehicle is not maintained at its set speed but returns to an idling speed.

The invention will be further understood from the following description and drawings in which:

FIGURE 3 is an elevational view of the control rod and the body casting which supports the actuating line or chain;

FIGURE 4 is a top plan view thereof as viewed along the line 4—4 of FIGURE 3;

FIGURE 5 is an end view as viewed along the line 5—5 of FIGURE 4;

FIGURE 6 is an enlarged cross-sectional view as taken along the line 6—6 of FIGURE 4;

FIGURE 7 is a cross-sectional view as taken along the line 7—7 of FIGURE 6;

FIGURE 8 is an elevational view of the control rod; and

FIGURE 9 is a view of a modified embodiment.

Figure 1:
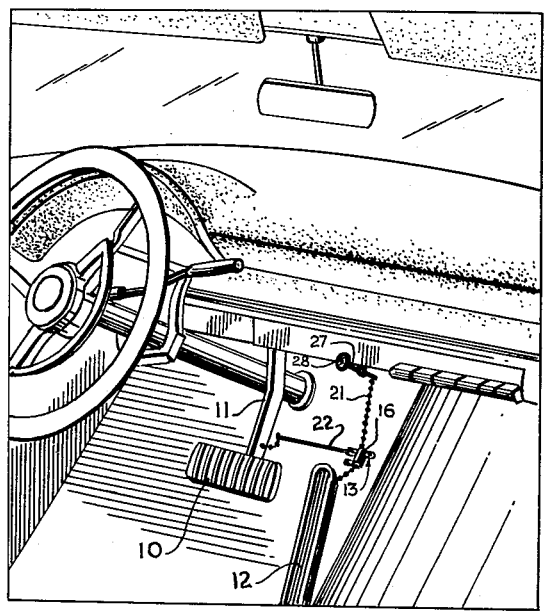
FIGURE 1 is a perspective view of the speed control as applied to an automotive vehicle.

Referring to FIGURE 1, an interior portion of a conventional vehicle is shown. This includes the usual brake pedal 10 with its lever arm 11 and the foot throttle or accelerator pedal 12 which is pivoted at its lower end as is conventional.

Figure 2:
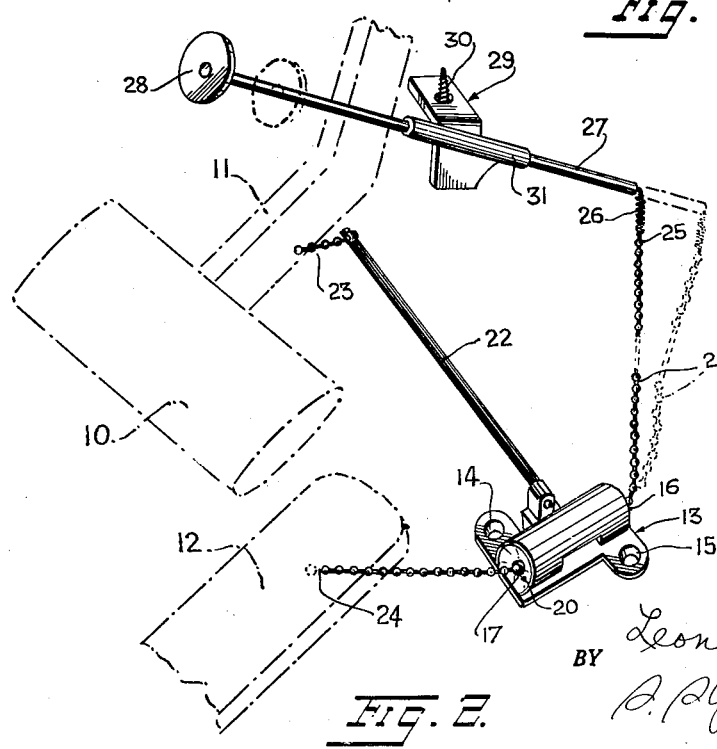
FIGURE 2 is a further perspective view of the apparatus, the involved vehicle parts being shown in broken lines.

FIGURE 1 shows the arrangement of the device of this invention, all portions of which are shown in FIGURE 2. Secured to the floor of the vehicle in front of the accelerator 12 is the body casting 13 which has ears 14 and 15 through which screws will be passed for connecting the body to the vehicle floor. Integral with body 13 is the solid cylinder 16 which is formed with a central bore 17, the bore 17 having flared outer ends 17a to better receive a pull chain as will hereinafter be described.

Cylinder 16 is centrally cut away at 18 to provide a through slot, the bore 17 being made thereby discontinuous.

At the bottom of the discontinuity of bore 17, the front portion of a lever arm 19 is disposed. As observed in FIGURE 6, lever arm 19 is inserted through slot 18 and is hingedly connected to cylinder 16 by hinge pins 20. Lever arm 19 thereby has a limited degree of swinging movement as indicated by the broken lines of FIGURE 6. It will further be observed that the effective size of bore 17 is varied thereby. In other words, when lever arm 19 is swung upwardly in the dotted line position of FIGURE 6, the front portion thereof swings and bore 17 becomes correspondingly smaller. Thus, the cylinder 16 of body casting 13 may serve as a detent device in combination with a flexible pull chain or line 21 as will hereinafter be described.

Chain 21 is simply of the beaded type which is conventional. In a typical installation, its length may be about 15 or 20 inches. It passes through bore 17 of cylinder 16 and may be clamped therein or loosely and slidably maintained therein depending upon the position of lever 19.

Connected to the upstanding arm 19a of lever 19 is locking rod 22 which controls the locking body 13 by actuating lever arm 19. Rod 22 is connected by short chain 23 (about 1 to 3 inches) to the lever arm 11 of brake pedal 10. However, it may also be connected to the conventional brake arm, whichever is more convenient.

Referring now to the chain 21 one end 24 thereof is fastened to the upper end of the accelerator 12. The other end 25 is connected to a coil spring 26 which is quite weak relative to the normal upward spring pressure on accelerator 12. For example, such normal pressure is about 6 to 8 pounds while that of spring 26 may be 1 or 2 pounds. The other end of spring 26 is secured to slidable control rod 27 which is provided at its upper end with an actuating knob 28. Rod 27 is slidably mounted in bracket 29 which is connected under the dash as by screw 30. Bracket 29 includes tube 31 which serves as a bearing in which rod 27 slides.

The operation of the above described unit is as follows:

First let us assume that the speed control is not being used. In this condition, there is provided sufficient slack in that portion of the chain between the accelerator 12 and the body casting 13 so that the accelerator may be actuated normally without hindrance. Whether or not the brake pedal 10 is actuated is of no importance since the chain may be locked or unlocked within cylinder 16 without affecting the device which is at this point not operating because of the slack.

In order to put the device in operation, the accelerator 12 is pedally depressed until the desired speed is attained. Then the knob 28 is pulled upward, the rod or shaft 27 sliding freely in tubular bearing 31. It will be understood that at this time the chain 25 is being held by the cylinder 16. Accordingly, the spring 26 will extend thereby creating a pull or tension on the chain 21. At this time the operator will step lightly on the brake pedal 10 which will swing lever arm 19 so as to release the chain 21. When the clamping pressure is thus released against the two or three beads that are in the central portion of cylinder 16, the chain 21 will be pulled taut by the action of spring 26 thus maintaining the accelerator pedal 12 in the position where it has been set. Of course, the depression of the brake pedal is only momentary, its release causing the chain 21 to be again clamped in cylinder 16, the normal spring pressure on brake pedal 10 actuating the locking rod 22 upwardly for clamping the chain.

The vehicle will now proceed at the set speed just as if the operator were maintaining his foot pressure on the accelerator pedal 12. If the operator wishes to further speed up the vehicle, he need simply step on the pedal 12 and depress it further. On the other hand, assuming that he wishes to slow down or restore the vehicle to motor idling position, he need simply step on the brake pedal 10. This will actuate rod 22 and lever arm 19 to the chain release position whereupon the normal spring connected to accelerator pedal 12 will pull the chain and rod 27 to their original position as indicated by the broken lines of FIGURE 2.

Actually, in this embodiment the spring 26 is not strictly necessary for the operation of the device, but it is desirable since it produces smoother operation. It will be further noted that the device has an inherent safety feature in that if either chain 21 or 23 breaks, the accelerator pedal 12 will return to the motor idling position since the locking rod 22 falls by gravity and pulls down the lever arm 19.

In FIGURE 9 I show a variation of the above construction. In this embodiment, the control rod or shaft 27a is formed with pin 35 which may be engaged by a bayonet slot 36 in tubular bearing 31a. Accordingly, the control rod 27a may be locked in an upward position so that it will not return to the broken line position shown in FIGURE 2. This eliminates one step in putting the unit in operation. The unit will, however, nevertheless tend to return to an idling position when the brake 10 is depressed and the chain unlocked. The reason therefor is that spring 26 is weak compared to the conventional upwardly acting spring on accelerator 12. Accordingly, when the chain is unlocked, the accelerator 12 will be drawn to an idling position in accordance with the action of its own spring and against the action of spring 26, while the control rod 27 remains fixed. In this connection, the operator may, if desired, maintain some foot pressure on the accelerator so that the vehicle will slow down rather than return wholly to the idling position.

I have shown what is now considered a preferred embodiment of the invention but it is obvious that changes and omissions may be made without departing from its spirit.

What is claimed is:

1. An automotive accelerator pedal hold down device for use in a vehicle having a spring controlled accelerator pedal and a brake device, said hold down device comprising a flexible line adapted to be connected at one end thereof to the accelerator pedal of the vehicle for maintaining the pedal in a selected depressed position, pull means for said flexible line, a locking body on said line disposed between said one end and said pull means for locking said line in a predetermined control position in respect to the accelerator pedal, said locking body including a lever arm, a locking control member connected to one end thereof to said lever arm, said pull means comprising a pull rod having an actuating knob, said locking body having a bore formed therethrough and said line extending through said bore, said lever arm being swingable to a clamping or releasing position in respect to said line, said locking control member being connected to said lever arm, and a flexible line connected to the other end of said locking control member and adapted to be connected to the brake device of the vehicle whereby said brake device may exert a thrust on said locking control member, said first-named flexible line comprising a beaded chain, said locking body comprising a cylindrical member, said cylindrical member being formed with a cut-out therethrough and communicating with said bore whereby said bore is discontinuous, said lever arm having a swingable front portion thereof disposed in said cut-out at the bottom of said bore whereby the size of the bore may be adjusted to produce either clamping or releasing of said beaded chain.

2. A hold down device according to claim 1 and wherein said pull means includes a coil spring, said coil spring being disposed between said pull rod and said first-named flexible line, said coil spring exerting a force which is lesser in magnitude than the spring controlling said accelerator pedal.

3. The combination with an automotive vehicle having a spring controlled accelerator pedal and a brake pedal, of an accelerator pedal hold down device for said vehicle, said hold down device comprising a flexible line one end of which is connected to said accelerator pedal for maintaining the accelerator pedal in a selected depressed position, pull means connected to the other end of said line, a locking body on said line disposed between said one end of said line and said pull means for locking said line in a predetermined control position in respect to the accelerator pedal, said locking body including a lever arm, a locking control member connected at one end thereof to said lever arm, said pull means comprising a pull rod having an actuating knob, said locking body having a bore formed therethrough and said line extending through said bore, said lever arm being swingable to a clamping or releasing position in respect to said line, said locking control member being connected to said lever arm, and a flexible line connected to said other end of said locking control member, said last-named flexible line being connected to the brake pedal of the vehicle whereby said brake pedal may exert a thrust on said locking control member, said locking body comprising a cylindrical member, said cylindrical member being formed with a cut-out therethrough and communicating with said bore whereby said bore is discontinuous, said lever arm having a swingable front portion thereof disposed in said cut-out at the bottom of said bore whereby the size of the bore may be adjusted to produce either clamping or releasing of said first-named flexible line.

4. The combination according to claim 3 and wherein said pull means includes a coil spring, said coil spring being disposed between said pull rod and said first-named flexible line, said coil spring exerting a force which is lesser in magnitude than the spring controlling said accelerator pedal.

5. The combination according to claim 4 and including a tubular bearing for said rod in which said rod normally slides, and means to lock said rod in said bearing against sliding movement.

References Cited in the file of this patent
UNITED STATES PATENTS

| | | |
|---|---|---|
| 2,270,002 | Glick | Jan. 13, 1942 |
| 2,313,000 | Hauguel | Mar. 2, 1943 |
| 2,471,690 | Howland | May 31, 1949 |
| 2,477,865 | Du Charme | Aug. 2, 1949 |
| 2,670,822 | Reilly | Mar. 2, 1954 |
| 2,765,672 | Dixon | Oct. 9, 1956 |
| 2,784,615 | Kaplan | Mar. 12, 1957 |
| 2,856,043 | Nelson | Oct. 14, 1958 |